(12) United States Patent
Kawamura et al.

(10) Patent No.: US 7,189,453 B2
(45) Date of Patent: *Mar. 13, 2007

(54) FUNCTIONAL SURFACE MEMBER

(75) Inventors: Koichi Kawamura, Shizuoka (JP); Takeyoshi Kano, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 5 days.

This patent is subject to a terminal disclaimer.

(21) Appl. No.: 10/663,845

(22) Filed: Sep. 17, 2003

(65) Prior Publication Data

US 2004/0058146 A1    Mar. 25, 2004

(30) Foreign Application Priority Data

Sep. 24, 2002    (JP)  ......................... P. 2002-277339

(51) Int. Cl.
    *B32B 5/16*      (2006.01)
(52) U.S. Cl. ...................... 428/323; 428/328; 428/330
(58) Field of Classification Search ................ 428/323, 428/328
See application file for complete search history.

(56) References Cited

U.S. PATENT DOCUMENTS

| | | | | |
|---|---|---|---|---|
| 3,998,602 A | * | 12/1976 | Horowitz et al. | ............ 428/621 |
| 6,334,926 B1 | * | 1/2002 | Kang et al. | .............. 156/272.6 |
| 6,566,029 B2 | * | 5/2003 | Kawamura et al. | ......... 430/138 |
| 6,811,878 B2 | * | 11/2004 | Kawamura et al. | ......... 428/402 |
| 2004/0001947 A1 | * | 1/2004 | Kawamura et al. | ......... 428/327 |

FOREIGN PATENT DOCUMENTS

| | | |
|---|---|---|
| EP | 1 216 831 A1 | 6/2002 |
| EP | 1 271 561 A2 | 1/2003 |
| EP | 1 281 516 A2 | 2/2003 |
| EP | 1 282 175 A2 | 2/2003 |
| EP | 1 336 637 A1 | 8/2003 |
| EP | 1 338 431 A2 | 8/2003 |
| JP | 6-18706 | 1/1994 |
| JP | 11-287902 | 10/1999 |

\* cited by examiner

*Primary Examiner*—Monique R. Jackson
(74) *Attorney, Agent, or Firm*—Sughrue Mion, PLLC

(57) ABSTRACT

A functional surface member comprising a support having a surface on which a graft polymer chain having a nonionic polar group in the side chain thereof is bonded and provided thereon a layer comprising adsorbed fine particle capable of polarly bonding to the polar group.

4 Claims, No Drawings

FUNCTIONAL SURFACE MEMBER

FIELD OF THE INVENTION

The present invention relates to a functional surface member. Particularly, the invention relates to a functional surface member having a functional surface layer comprising adsorbed various functional fine particles, for example, a roughened surface member, a conductive member and a light shielding member.

BACKGROUND OF THE INVENTION

Various members having a surface layer with various functions prepared by adsorbing functional fine particles on appropriate substrates have been proposed. Examples of the member having a fine particle-adsorbed surface layer include anti-reflection members with irregularity formed by fine metal particles, conductive members having conductive fine particles adsorbed thereon, anti-staining and antibacterial members having antibacterial metal (or metal oxide) adsorbed thereon, gas barrier films reducing gas permeability by utilizing fine particle-laminated structure and light shielding members using fine particle materials shielding ultraviolet ray, infrared ray or visible light.

As typical examples thereof, the roughened surface members having the specified fine irregularity are useful as materials for controlling the refractive index at an interface to prevent light reflection.

In recent years, image displays as typified by liquid crystal display (LCD), plasma display (PDP), cathode ray tube display (CRT) and electro luminescence (EL) lamp have been used increasingly in various fields, for example, television sets, computer machines and various mobile units which are becoming widespread recently. Such image displays have made prominent progresses. With improvement of the functions of various units using the displays, the demands of high-quality imaging and low electricity consumption toward the displays are increasing. For the high-quality imaging, anti-reflection property preventing reflection of light such as illumination on the display surface is an important element, along with the improvement of the pixel density in images and the achievement of bright color tone.

Particularly, since it is expected that displays for portable terminals which are becoming more widespread lately be obviously used outdoors, the demand of strong anti-reflection property preventing reflection of exterior light such as sunlight or fluorescent light on the display is increasing more than ever.

Additionally, LCDs of lightweight, compact size and versatility are broadly used. In the mobile units (portable terminals), the touch-panel input mode, namely an operation mode with direct touching of predetermined areas on the display surface with a plastic pen or fingers is frequently used. Not only image quality and anti-reflection property but also properties, for example, durability such as abrasion resistance and anti-staining property are now important for the display surface.

For the prevention of reflection, an approach to roughening the incident surface so as to scatter or disperse light has been ordinarily made in the related art. Treatment for roughening the surface include, for example, a roughening method of substrate surface directly with a sandblast process or an emboss process and a method for providing a surface roughened layer by coating a coating solution containing fillers on the substrate surface and drying.

Among them, the method for providing a surface roughened layer containing fillers on the substrate surface is commonly used currently from the standpoint of the controllability of the dimensions of irregularity on the surface to be roughened and the easy production of surface roughened layer.

For example, patent reference 1 (JP-A-6-18706 (the term "JP-A" as used herein means an "unexamined published Japanese patent application")) proposes a surface roughened layer comprising a UV-curing resin and a resin bead for the purpose of applying to highly transparent plastic film with poor thermal resistance.

A proposition using an inorganic pigment having good abrasion resistance such as silica instead of the resin bead is also made. However, such inorganic pigment is disadvantageous in its dispersibility, thereby causing a problem that a uniformly roughened surface layer is hardly produced. Therefore, for example, patent reference 2 (JP-A-11-287902) proposes a surface roughened layer using two kinds of pigments comprising silica and a resin filler having good dispersibility.

However, any one of these methods is a method of forming a surface roughened layer by coating filler for forming irregularity with a binder on a substrate. Therefore, the method has potentially a problem in that the level of the irregularity formed from the filler is reduced upon the influence of the binder, so that the anti-reflection property at the level as planned is hardly obtained. Further, when the binder is diluted or the amount of binder used is reduced for the purpose of improving the effect of filler on the irregularity, the strength of the resulting film is deteriorated so that it is likely to cause a problem of the durability.

As another method for forming an anti-reflection layer, a method of laminating alternately a material of a large refractive index and a material of a small refractive index to form a multi-layer construction is known. Specifically, the method for forming a multi-layer construction includes a vapor phase process of forming a film including alternately depositing a material of a small refractive index as typified by $SiO_2$ and a material of a large refractive index such as $TiO_2$ or $ZrO_2$ and a sol gel process using hydrolysis and condensation polymerization of metal alkoxide.

Regarding these methods for forming anti-reflection layer of multi-layer construction, the vapor phase process using deposition requires a costly processing apparatus and involves difficulty in the production of anti-reflection layer of large size, while the sol gel process requires high production costs because of the repetition of the coating and baking procedures and additionally involves a problem in that stain is noticeable on the resulting anti-reflection layer because the anti-reflection layer is colored purple or greenish.

Patent Reference 1: JP-A-6-18706
Patent Reference 2: JP-A-11-287902

SUMMARY OF THE INVENTION

In light of the disadvantages of the prior art as described above, it is an object of the invention to provide a functional surface member, which has a fine particle-adsorbed layer excellent in durability comprising functional fine particles strongly adsorbed on the surface in the form of a single layer or a laminate layer, and in which the effect of the functional fine particles adsorbed is sustainable.

Another object of the invention is to provide a functional surface member having the properties described above, wherein a fine particle-adsorbed layer of a multi-layer construction is readily formed.

Other objects of the invention will become apparent from the following description.

The above-described objects of the invention are attained by a functional surface member comprising a support having a surface on which a graft polymer chain having a nonionic polar group in the side chain thereof is bonded and provided thereon a layer comprising adsorbed fine particles (particularly, fine metal particles) capable of polarly bonding to the polar group.

The mechanism of the invention is not definitely clear. In accordance with the invention, however, polar groups are introduced onto a surface of a support and a layer composed of uniformly filled in the high density with fine particles, which have properties capable of bonding with the polar group upon the polar interaction therebetween, for example, functional fine metal particles, e.g., fine particles of metal oxide is formed on the surface of the support. Consequently, a surface layer of the fine particles is formed without using a binder. Specifically, a fine particle-adsorbed layer reflecting the shape of fine particle or the function of fine particle as it is, for example, a surface roughened layer having uniform irregularity, or a functional surface layer, e.g., a conductive layer of conductive fine particles is formed. The surface layer can exert excellent functions. It is assumed that since the polar groups on the surface and the fine particles capable of adsorbing the polar groups are strongly adsorbed each other upon the polar interaction, the abrasion resistance is enhanced, so that the fine particle-adsorbed layer exhibits high durability.

The presence of the fine particle-adsorbed layer having such construction is recognized apparently by observing the surface using an atomic force microscope (AFM) or by observing the cross section using a scanning electron microscope. Specifically, the structure of the layer is confirmed based on the formation of fine irregularity on the surface or the formation of laminate of fine particles. It is also possible to confirm the presence of the functional layer composed of fine particles by measuring the properties derived from the functional fine particles.

DETAILED DESCRIPTION OF THE INVENTION

The invention is described in detail below.

The functional surface member of the invention has a graft polymer chain having a nonionic polar group in the side chain thereof on at least one surface of a support. In general, the surface having such polar groups is preferably prepared by a surface grafting process. In order to obtain a light transmitting member, for example, an anti-reflection film and an infrared absorption film, a transparent material is preferably used as the support.

[Support Having Polar Group Introduced onto the Surface Thereof]

The surface having bonded thereto a graft polymer chain having a nonionic polar group in the side chain thereof means a state of surface having polar groups prepared by a surface grafting process of grafting a monomer having a nonionic polar group in the side chain thereof on the surface of support by hitherto known techniques using, for example, light, electron beam or heat, or by bonding a macromer or polymer having a nonionic polar group in the side chain thereof onto the surface of support. The nonionic polar group preferably includes a nonionic polar group having a hetero atom, including specifically, for example, a nitrogen atom, a sulfur atom or an oxygen atom. Examples of the nonionic polar group having a hetero atom include a hetero aromatic group having a nitrogen atom or a sulfur atom, e.g., a pyridine group, a quinoline group, a thiophene group or a benzothiophene group; an amino group, e.g., a dimethylamino group or a diethylamino group; an ether group or a thioether group having an oxygen atom or a sulfur atom, e.g., an ethyleneoxy group or a thioethyleneoxy group; a lactone group, e.g., butyrolactone; and a lactam group, e.g., pyrrolidone.

In order to introduce a graft polymer chain having a nonionic polar group in the side chain thereof onto the surface of support such as a film, specifically, the methods described, for example, in "Nippon Gomu Kyokaishi", Vol. 65, p. 604 (1992) and Shinji Sugii, "Surface Modification and Adhesion with Macromonomer" can be referred to. Further, the process called a surface graft polymerization process described below can also be employed.

A graft polymerization process is a process for preparing a graft polymer by providing an active site to a chain of a high molecular compound to initiate polymerization of a different monomer from the active site. When the high molecular compound providing the active site forms a solid surface, the process is particularly called the surface graft polymerization process.

As the surface graft polymerization process for practicing the invention, any known method described in references can be used. For example, in The Society of Polymer Science, Japan, "New Polymer Experimentology, Vol. 10", p. 135, Kyoritu Shuppan Co., Ltd. (1994), a photo graft polymerization process and a plasma irradiation graft polymerization process are described as the surface graft polymerization process. Also, in Takeuchi supervised, "Adsorption Technique Manual", p. 203 and p. 695, NTS Inc. (February 1999) a graft polymerization process under irradiation of radiation, for example, γ ray and electron beam.

As specific methods for the photo graft polymerization process, the methods described in JP-A-63-92658, JP-A-10-296895 and JP-A-11-119413 can be used.

Besides the processes, the method for preparing a surface having a graft polymer includes a method of imparting a reactive functional group, for example, a trialkoxysilyl group, an isocyanate group, an amino group, a hydroxy group or a carboxy group to a terminal of a polymer compound chain and conducting a coupling reaction of the reactive functional group with a functional group on the support surface. In recent years, an atom transfer radical polymerization technique has been used for the surface graft polymerization process. It has been found that the use of such technique enables the formation of bonds of graft polymers on the surface in the high density. The atom transfer radical polymerization technique can be carried out with reference to K. Matyjaszewski, et al., "Polymer Preprints", Vol. 41, p. 411 (2000), M. L. Bruening, et al., "J. Am. Chem. Soc.", Vol. 122, p. 7616 (2000) and "Macromolecules", Vol. 35, p. 1175 (2002).

Specific examples of useful monomer having a nonionic polar group and containing a heteroatom, e.g., nitrogen, sulfur or oxygen, which is preferably used for the surface graft polymerization according to the invention, include 4-vinylpyridine, 2-vinylpyridine, N-vinylpyrrolidone, N,N-dimethylaminoethyl(meth)acrylate, N-morpholinoethyl (meth)acrylate, methoxydiethylene glycol (meth)acrylate, methoxypolyethylene glycol (meth)acrylate, γ-butyrolactone (meth)acrylate and mevalonic lactone (meth)acrylate.

In case that the functional surface member is used as a roughened surface member of anti-reflection material for an image display of high resolution having a high pixel density or an image display of small size and high resolution for use in mobile unit, a transparent support having a smooth surface is preferably employed in order to control the surface irregularity to be formed. In order to more improve a macroscopic anti-reflection property, the surface of support may preliminarily be roughened for the purpose of enlarging the surface area to introduce a large number of the nonionic polar groups.

As the method for roughening the support, a known method suitable for the material of support can be selected. Specifically, in case that the support is a resin film, for example, glow discharge treatment, sputtering, sandblast polishing method, buff polishing method, particle deposition method or particle coating method are exemplified. In case that the support is a metal plate such as an aluminum plate, for example, a mechanically roughening method, a method of electrochemically dissolving and roughening surface or a method of chemically dissolving selectively surface is utilized. The mechanical roughening method used includes known methods, for example, ball polishing method, brush polishing method, blast polishing method and buff polishing method. The electrochemical roughening method includes a method conducting in an electrolyte of hydrochloric acid or nitric acid with an alternate current or a direct current. Further, a combination of the mechanical roughening method and the electrochemical roughening method may also be used.

[Fine Particle Capable of Bonding with Polar Group Upon Interaction Therebetween]

1. Fine Particle

The fine particle capable of bonding to the polar group is described. Fine metal particle used is appropriately selected depending on the intended use of the functional surface member. The metal used herein includes, for example, a metal element, e.g., a transition metal, an alkali metal, an alkaline earth metal, aluminum or silicon and includes not only simple metal but also a metal compound, for example, a metal oxide. Since the fine particle is adsorbed upon the polarity, the adsorbed amount is limited depending on the particle size of the fine particle. In general, the particle size is preferably in a range of from 0.1 nm to 1 μm, more preferably in a range of from 1 nm to 300 nm, and particularly preferably in a range of from 5 nm to 100 nm.

In accordance with the invention, the particles capable of bonding to the graft interface upon the interaction are regularly arranged in an almost monolayer state or are arranged in a multi-layer state due to the adsorption of each nanoscale metal fine particle onto the individual polar group of the long graft chain depending on the state of polar group.

Functional fine metal particle for use in the invention will be described according to the intended use of the functional surface member.

1.1 Fine Metal Particle for Anti-reflection Member

In case that the functional surface member of the invention is used as an anti-reflection member, it is preferred that at least one fine metal particle selected from fine particles of metal oxides is used as the functional fine particle. By using such fine particle, a surface roughened member preferably used as an anti-reflection member can be provided, which is preferred to use on the surface of image display, has uniform and excellent anti-reflection property to provide clear images without deterioration of image contrast and has excellent durability.

The fine particles of metal oxides preferably include silica ($SiO_2$), titanium oxide ($TiO_2$), zinc oxide (ZnO) and tin oxide ($SnO_2$). Further, fine particles of pigments including so-called transparent pigments and white pigments, for example, calcium carbonate, aluminum hydroxide, magnesium hydroxide, clay or talc can be used, when such particles have preferable shapes as described below.

In this application, the particle size of fine particle is preferably in a range of from 100 nm to 300 nm, more preferably in a range of from 100 nm to 200 nm. In this embodiment, the particles polarly bonding to the graft interface are regularly arranged in an almost monolayer state. In case that the surface roughened member according to the invention is used as an anti-reflection member, it is preferred in view of the effect that the film thickness is controlled to $\lambda/4$ wherein $\lambda$ is the wavelength at which reflection is to be prevented. In light of the fine particle size almost equal to a film thickness of surface roughened layer, the anti-reflection property tends to decrease because of a too thin thickness of the surface roughened layer, when the particle size is less than 100 nm. When the particle size is more than 300 nm, on the other hand, the diffusion reflection is large to cause significant white turbidity, so that it is hard to keep transparency and the contact area bonding to the graft interface upon polarity is too small so that the strength of surface roughened layer tends to decrease.

1-2. Fine Particle for Conductive Film

In case that the functional surface member of the invention is used as a conductive film, it is preferred that at least one fine particle selected from conductive or semiconductive, fine metal particles, fine particles of metal oxides and fine particles of metal compounds is used.

The conductive fine metal particles or the fine particles of metal oxides include those having a specific resistance of 1,000 $\Omega\cdot$cm or less. Specifically, they include, for example, powder of simple substances of silver (Ag), gold (Au), nickel (Ni), copper (Cu), aluminum (Al), tin (Sn), lead (Pb), zinc (Zn), iron (Fe), platinum (Pt), iridium (Ir), osmium (Os), palladium (Pd), rhodium (Rd), ruthenium (Ru), tungsten (W) and molybdenum (Mo) and their alloys thereof, and tin oxide ($SnO_2$), indium oxide ($In_2O_3$), indium tin oxide (ITO) and ruthenium oxide ($RuO_2$).

Particles of metal oxides and metal compounds having property of semiconductor may also be used. Examples thereof include fine particles of oxide semiconductors, for example, $In_2O_3$, $SnO_2$, ZnO, CdO, $TiO_2$, $CdIn_2O_4$, $Cd_2SnO_2$, $Zn_2SnO_4$ or $In_2O_3$—ZnO and those doped with suitable impurities, fine particles of spinel-type compounds, for example, MgInO or CaGaO, fine particles of conductive nitrides, for example, TiN, ZrN or HfN, and fine particles of conductive borides, for example, LaB. The metal particles may be used individually or as a mixture of two or more thereof.

1-3. Fine Metal Particle for Antibacterial Surface Material

In case that the functional surface member of the invention is used as an antibacterial material, fine metal particles having an antibacterial function or an bactericidal function are preferably used as the functional fine particle.

Material capable of forming such fine metal (metal compound) particle specifically includes, for example, simple metal substances having the bactericidal function, e.g., silver (Ag) or copper (Cu), alloys containing at least one of the simple metal substances, and metal oxides thereof. Further, the material includes semiconductors of metal compounds, which generate bactericidal action under irradiation of light having a wavelength in an ultraviolet region, for example, a florescent lamp and sunlight, for example titanium oxide, iron oxide, tungsten oxide, zinc oxide or strontium titanate, and metal compounds prepared by modification of these metal compounds, for example, with platinum, gold, palladium, silver, copper, nickel, cobalt, rhodium, niobium or tin.

1-4. Fine Particle for Ultraviolet Absorbing Member

In case that the functional surface member of the invention is used as an ultraviolet absorbing member, it is preferred to use fine particles of metal oxides, for example, iron oxide, titanium oxide, zinc oxide, cobalt oxide, chromium oxide, tin oxide or antimony oxide as the functional fine particle because the metal oxides have a high shielding function in the region of ultraviolet rays A and B (wavelength range of from 280 nm to 400 nm). In accordance with the invention, by using a polymer compound as the support in combination with the functional fine particle, an ultraviolet shielding film or sheet, which has high function and processability, is provided and it is expected to have various applications. It is also expected that a light shielding property of polymer material can be improved by using the ultraviolet shielding effect of metal oxide.

1-5. Fine Particle for Optical Material

The functional fine particle for use in a color filter, a sharp cut filter or a non-linear optical material employed in an optical device includes fine particles of semiconductor, for example, CdS or CdSe and metal, for example, gold. By using silica glass or alumina glass as the support, the resulting product can be preferably used as a color filter. The product is also expected to use as a non-linear optical material, for example, optical switch or optical memory material owing to the confirmation that the product has a large third order non-linear light acceptance ratio. Substance of the fine particle used specifically includes a rare metal, for example, gold, platinum, silver or palladium, and an alloy thereof. From the standpoint of stability, a substance, which is not rapidly dissolved with alkali, for example, gold or platinum, is preferably used.

Further, ultra-fine particles of metals (metal compounds) preferably used for the non-linear optical material specifically include, for example, simple substance of gold (Au), silver (Ag), copper (Cu), platinum (Pt), palladium (Pd), rhodium (Rh), osmium (Os), iron (Fe), nickel (Ni) or ruthenium (Ru) and alloy containing at least one of the simple substances, which has a mean particle size of from 10 to 1,000 angstroms. The particle size may be that of a primary particle or a secondary particle. However, the particle size, which does not cause scattering of visible light, is preferred. Among them, fine particles of rare metal selected from Au, Pt, Pd, Rh and Ag or metal selected from Ti, V, Cr, Mn, Fe, Ni, Cu, Zn, Cd, Y, W, Sn, Ge, In and Ga having a particle size of 10 nm or less and dispersed in a solvent, for example, toluene are preferred.

When the non-linear optical material is prepared using such ultra-fine particles according to a conventional method, i.e. sol-gel method, immersion method, sputtering method, ion injection method or melt deposition method, there are problems, for example, in that since the ultra-fine particles very readily aggregate, increase in concentration of the particles in the composition is difficult, resulting in reduction of productivity.

Particularly, members having such ultra-fine particles at a low concentration and a small contribution ratio of the ultra-fine particles to physical properties have only limited use and are unsuitable for image memory and optical integrated circuit utilizing the third order non-linear optical effect. According to the invention, the fine particles are directly bonded to the nonionic polar groups on the surface of support, and the nonionic polar groups exist in a high density by grafting. Therefore, the concentration of fine particle can readily be increased. The functional surface member having ultra-fine particles of the invention is particularly preferably used in the non-linear optical material among optical materials.

1-6. Fine Particle for Gas Barrier Film

In case that the functional surface member of the invention is used as a gas barrier film, it is preferred to use ultra-fine powders having a mean particle size of 100 nm or less, preferably 50 nm or less, which are made of inorganic compound, for example, silicone oxide, zirconium oxide, titanium oxide, alumina, magnesium oxide or tin oxide, or a metal, for example, aluminum, tin or zinc as the functional fine particles. The ultra-fine powders of the inorganic compound or metal are used individually or as a mixture of two or more thereof. By using an insulating inorganic compound such as silicone oxide as the ultra-fine powder, the entirety of functional surface member can have insulating property. Of the ultra-fine powders, ultra-fine powder of silicone oxide is preferred, because silicone oxide is particularly readily prepared into ultra-fine powder.

As the support, it is preferable to use an organic resin film having a high gas barrier property, for example, a polyethylene terephthalate, polyamide, polypropylene, ethylene-vinyl alcohol copolymer or polyvinyl alcohol film.

While the applications of the functional surface member of the invention and specific examples of the fine metal particle preferably used in the fields have been described, the invention should not be construed as being limited thereto. Appropriately selecting a support having polar groups introduced into at least one surface thereof and fine metal particles having properties capable of bonding to the polar groups and combining them each other, various members having a functional surface utilizing the properties of functional fine particles can be constructed.

[Adsorption of Fine Particle onto Polar Group]

According to specific embodiment of the adsorption, a graft polymer chain of polyvinyl pyridine is introduced onto the surface of a support using, for example, a nonionic monomer having a pyridine group as a polar group, and then, the support is immersed in a dispersion solution of fine silica particle for a prescribed period of time. Subsequently, the excess of the dispersion solution is washed with a solvent to remove, whereby a fine particle-adsorbed layer of fine silica particles adsorbed at a high density is formed on the surface of support.

In such a manner, polar groups are introduced on the support and fine particles as described above are adsorbed thereto to provide a fine metal particle-adsorbed layer having a desired function. The thickness of fine metal particle-adsorbed layer can be appropriately selected depending on the intended use. In general, the thickness of the layer is preferably in a range of from 1 nm to 1 μm, more preferably in a range of from 10 nm to 0.5 μm. When the thickness of the layer is too small, the scratch resistance is apt to be reduced. When the thickness of the layer is too large, the transparency is apt to be decreased.

[Support]

The support used for forming a surface having a graft polymer chain having a nonionic polar group in the side chain thereof is any dimensionally stable plate-like substance, which satisfies required properties, for example, flexibility, strength or durability. In case that light transmittance is required, a transparent support, for example, a glass plate, a quartz plate, a plastic film (e.g., a cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate or polyvinyl acetal film) is selected. The support for functional surface member, which is not required to have transparency, includes, for example, a silicone plate, paper, paper laminated with plastic, a metal plate (e.g., an aluminum, zinc or copper plate), and paper or a plastic film laminated or deposited with the metal as described above, in addition to those described above.

The support is appropriately selected depending on the use and the relation to the adsorbed fine particles. In view of processability and transparency, a support having a surface composed of a polymer resin is preferably used. Specifically, a resin film, a transparent inorganic support, for example, a glass plate having a resin-coated surface, and a composite material having a surface layer composed of a resin are preferable.

The support having a resin-coated surface typically includes, for example, a laminate plate having a resin film adhered on the surface thereof, a primer-treated support and a hard coat-treated support. The composite material having a surface layer composed of resin typically includes, for example, a resin seal material having an adhesive layer on the back surface thereof and a laminated glass of glass and resin.

In the functional surface member of the invention, a layer of fine particles having a specified function, for example, fine particles of metal oxide typified by silica uniformly adsorbed in the high density onto a polar group introduced onto the support. Because the surface layer of the fine particles adsorbed in a monolayer state or a multi-layer state to the polar groups is formed without using any binder, the surface works as a functional surface reflecting the properties of the fine particle as they are. In case that fine particles for a roughened surface member are used as the fine particles, for example, a roughened surface layer having uniform and dense irregularities reflecting the shape of fine particle is formed. In case that the roughened surface member is used as an anti-reflection material, although the layer itself is thin, it can provide a high anti-reflection property. Thus, since no concern about the damage of light transmittance arises by using together with a transparent support, the functional surface member can be preferably used not only for reflection type image display but also for transmission type image display.

The fine particle-adsorbed layer capable of reflecting the characteristics of the functional fine particles based on appropriately selection thereof can be formed on an appropriate support surface by relatively simple treatment. Moreover, the functional surface member of the invention has an advantage in that it can be used preferably for the various uses as described above, because the fine particle-adsorbed layer capable of exhibiting the excellent function has high durability.

Illustrating further the use, the functional surface can exhibit various functions by appropriate selection of the fine metal particles. For example, electronic and electric functions are provided by using conductive inorganic fine particles, a magnetic function is provided by using magnetic fine particles, for example, ferrite particles, and an optical function is provided by using fine particles absorbing, reflecting or scattering light of a specified wavelength. The functional surface member can be widely used in the fields, for example, various industrial products, pharmaceutical products, catalysts, varistors (variable resistors) and paints. In addition to these various functions of the various materials having fine particles, the use of a polymer material as the support enables utilization of mold processing facility of the polymer material, which expects the developments of novel materials.

Specific examples of the use in a wide range include applications to optical components; sunglasses; shield films, shield glass, shield windows, shield containers and shield plastic bottles against light, for example, ultraviolet ray, visible light or infrared ray; antibacterial films; microorganism disinfect filters; antibacterial plastic moldings; fishing nets; various OA equipments and home electronic equipments, for example, television set parts, telephone set parts, OA equipment parts, vacuum cleaner parts, electric fan parts, air conditioner parts, refrigerator parts, washing machine parts, humidifier parts or dishwasher parts; sanitary products, for example, toilet seats or wash stand parts; other building materials; vehicle parts; commodities; toys; and miscellaneous goods.

The invention will be described in greater detail with reference to the following examples, however, the invention should not be construed as being limited thereto.

EXAMPLE 1

[Preparation of Surface Polyvinyl Pyridine Graft by Atom Transfer Radical Polymerization]

A glass plate thoroughly washed was immersed in 1% toluene solution of 5-(trichlorosilylpentyl)-2-bromo-2-methylpropionate (initiator-terminated silane coupling agent) in argon stream. After the immersion overnight at ambient temperature, the glass plate was taken out and washed with toluene and then methanol to obtain a glass plate having the initiator-terminated silane coupling agent fixed thereon. The initiator-terminated silane coupling agent, i.e., 5-(trichlorosilylpentyl)-2-bromo-2-methylpropionate was synthesized by the method described in the reference (see C. J. Hawker, et al., Macromolecules, Vol. 32, p. 1424 (1999)).

Then, a solution was prepared by dissolving 4-vinylpyridine (47.7 g), cuprous bromide (0.646 g) and tris-(2-dimethylaminoethyl)amine (1.0 g) in isopropanol (100 ml), followed by purging with argon stream for 15 minutes for deaeration. The glass plate having the initiator-terminated silane coupling agent fixed thereon was immersed in the solution at ambient temperature. After the immersion for one hour, the glass plate was taken out and washed with water and then methanol. The glass plate was then cleaned by rubbing the surface thereof with a cloth (Bemcot, manufactured by Asahi Kasei Corp.) impregnated with methanol, whereby Support A having the surface graft polymer was prepared. A film thickness was measured by ellipsometry (VB-250, manufactured by J. A. Woollam Co., Inc.) and it was confirmed that the film thickness of grafting was 10 nm.

[Fine Particle of Metal Oxide Capable of Interacting with Polar Group]

In this example, $TiO_2$ particle was used as the fine particle of metal oxide.

[Adsorption of Particle Onto Support]

Support A having the surface graft polymer was immersed in a dispersion solution of a $TiO_2$ dispersion (H40, manufactured by Taki Chemical Co., Ltd.) (5 g) and water (5 g) for 20 minutes. Subsequently, the surface of Support A was thoroughly washed with running water to remove the excess aqueous dispersion solution of fine particle, whereby Roughened Surface Member B having a roughened surface layer composed of fine particles adsorbed on the surface thereof was obtained.

The surface of Roughened Surface Member B was observed with a transmission electron microscope (JEM-200CX, manufactured by JEOL Ltd.) at 100,000-fold magnification. It was confirmed that dense irregular shapes due to the fine particles were formed on the surface.

[Evaluation of Anti-reflection Property]

A ratio of the reflected beam $\phi r$ to the incident beam $\phi i$ ($\phi r/\phi i$), that is, visible reflectance (%) on the surface of roughened surface member was measured by a spectrometer. The visible reflectance of Roughened Surface Member B was 0.2%. It was thus confirmed that Roughened Surface Member B had the excellent anti-reflection property.

[Evaluation of Abrasion Resistance]

The surface of Roughened Surface Member B was rubbed with a cloth (Bemcot, manufactured by Asahi Kasei Corp.) moistened with water by hands thirty times in a reciprocal fashion. After the rubbing, the surface thereof was observed by a transmission electron microscope (JEM-200CX, manufactured by JEOL Ltd.) at 100,000-fold magnification in the same manner as described above. As a result, the dense irregular shapes due to the fine particles similar to the shapes observed before the rubbing were observed and it was confirmed that the dense irregular shapes on the surface were not damaged through the rubbing.

EXAMPLE 2

[Fine Particle of Metal Oxide Capable of Interacting with Polar Group]

In this example, $SiO_2$ particle was used as the fine particle of metal oxide.

[Adsorption of Particle onto Support]

Substrate A having the surface graft polymer as prepared in Example 1 was immersed in a dispersion solution of a silica particle having a mean particle size of 200 nm (Seaholstar P-20, manufactured by Nippon Shokubai Co., Ltd.) (10 g) in cyclohexane (90 g) for 20 minutes. Subsequently, the surface of Substrate A was thoroughly washed with acetone and the running water to remove the excess dispersion solution of fine particle, whereby Surface Roughened Member C having a roughened surface layer was obtained.

The surface of Roughened Surface Member C was observed with a transmission electron microscope (JEM-200CX, manufactured by JEOL Ltd.) at 100,000-fold magnification. It was confirmed that dense irregular shapes due to the fine particles were formed on the surface.

The anti-reflection property and abrasion resistance of the Roughened Surface Member C were evaluated in the same manner as in Example 1. The visible reflectance was 0.2%. Even after the rubbing, change in the irregular shapes on the surface was not observed. Hence, it was found that the high anti-reflection property and abrasion resistance of the surface were also achieved in this example.

The results of the evaluation described above indicate that the functional surface member of the invention exhibits excellent performances corresponding to the function of the fine particles adsorbed and that the fine particle-adsorbed layer formed on the surface has excellent durability. Therefore, the functional surface member of the invention is useful for materials having various functional surfaces suitable for practical use.

In accordance with the invention, a functional surface member, which has a fine particle-adsorbed layer excellent in durability comprising functional fine particles strong adsorbed on the surface thereof and in which the effect of the fine particles adsorbed is sustainable, can be provided.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A functional surface member comprising a support having a surface on which a graft polymer chain having a nonionic polar group in the side chain thereof is bonded and provided thereon a layer comprising the graft polymer and adsorbed fine particles capable of polarly bonding to the polar group in the side chain of the graft polymer, wherein the nonionic polar group is a heteroaromatic group having a nitrogen atom or a sulfur atom, and the adsorbed fine particles have a size range of from 1 nm to 300 nm.

2. The functional surface member according to claim 1, wherein the fine particles capable of polarly bonding to the polar group are fine metal particles.

3. The functional surface member according to claim 1, wherein the heteroaromatic group is at least one group selected from the group consisting of a pyridine group, a quinoline group, a thiophene group and a benzothiophene group.

4. The functional surface member according to claim 1, wherein the heteroaromatic group is a pyridine group.

* * * * *